Heat treatment time

Heat treatment time

United States Patent Office

3,679,633
Patented July 25, 1972

3,679,633
ELONGATION-SET POLYURETHANE ELASTOMERIC FIBERS AND PROCESS OF PREPARATION
Kanji Matsubayashi and Hiroyuki Segawa, Kurashiki, Japan, assignors to Kuraray Co., Ltd., Kurashiki, Japan
Continuation of application Ser. No. 498,470, Oct. 20, 1965. This application Jan. 6, 1970, Ser. No. 924
Claims priority, application Japan, Dec. 19, 1964, 39/71,840
Int. Cl. C08g 22/08, 53/20; C01f 7/06
U.S. Cl. 260—75 NE        4 Claims

ABSTRACT OF THE DISCLOSURE

Elongation-set polyurethane elastomeric fibers are prepared by drawing the fiber formed from a reaction product of a polymeric diol having a molecular weight between 200 and 8,000, an organic diisocyanate and a glycol and heat treating the drawn fiber to reduce the elongation to a value not exceeding 150%.

---

The present invention relates to a method of preparing elongation-set synthetic fibers from a specified class of polyurethane elastomers.

This application is a continuation application of our copending application Ser. No. 498,470 "Method of Preparing Elongation-Set Polyurethane Elastomeric Fibers" filed Oct. 20, 1965, and now abandoned.

Recently synthetic fibers formed from polyurethane elastomers have been supplied in large quantities in the form of, e.g., spun yarns, core spun yarns, covering yarns or woven or knitted fabrics because of the advantages that they have excellent elastic elongation reaching from 300 to 700% and that they are superior in aging resistance to conventional shirrings and obtainable in finer deniers than the latter.

It is very difficult, however, to employ for handling or processing of the polyurethane elastomeric fibers such apparatus as hitherto have been employed for spinning, weaving, knitting or otherwise processing non-elastic fibers, such as cotton, viscose rayon, polyamide fibers, polyvinyl alcohol fibers or the like, because of very large elastic elongations of the polyurethane elastomeric fibers as mentioned above in contrast with relatively low elastic elongation, say at most 30%, of the non-elastic fibers.

Therefore polyurethane elastomeric fibers hitherto have been processed or handled in methods in which they have been previously sized with polyvinyl alcohol or, alternately, processed or handled in specifically designed spinning machines, but these methods are troublesome and have a low production rate compared with processing or handling of the conventional non-elastic fibers; this has unignorable influences on the cost of polyurethane elastomeric fiber products.

After various investigations, the inventors have succeeded in lowering the elongation of the polyurethane elastomeric fiber and, thereby converting the polyurethane elastomeric fiber to a fiber of the characteristics, e.g., tenacity and Young's Modulus, similar to that of non-elastic fibers. This has been achieved by subjecting the polyurethane elastomeric fiber to a simple treatment, that is to say, a polyurethane elastomeric fiber formed of a specific polyurethane elastomer can be reduced in elongation by subjecting, after drawing, to a simple heat treatment. Accordingly the polyurethane elastomeric fiber which has been subjected to such treatment can be easily processed either alone or in mixture with other non-elastic fibers in a conventional apparatus to spun yarns, core spun yarns, covering yarns or woven or knitted fabrics because of the characteristics similar to those of the non-elastic fibers.

The present invention, in particular, consists in drawing a polyurethane elastomer having segments of a melting point of not exceeding 80° C. consisting of a reaction product of three ingredients, i.e., a polymeric diol with a molecular weight of from 200 to 8,000, preferably from 500 to 5,000, an organic diisocyanate and a diol as chain extender, to a drawing ratio below its breaking elongation and subsequently subjecting the drawn elastomer to a heat treatment at a temperature in the range between 50° C. and the melting point or decomposition temperature thereof to fix the elongation of the elastomer to a value of not more than 150%.

In preparation of polyurethane elastomeric fibers to which the invention is applicable, as polymeric glycol there may be used polyester glycols, polyether ester glycols, polyether glycols and mixtures thereof, though the invention is of great utility when applied to a polyurethane elastomeric fiber derived from a polyester glycol. The polyester glycol includes those having terminal hydroxyl groups obtainable by polycondensation of an aliphatic dicarboxylic acid, such as adipic acid or sebacic acid, with an aliphatic glycol, such as ethylene glycol, propylene glycol, butylene glycol, or hexamethylene glycol, and those having terminal hydroxyl groups obtainable by ring opening polymerization of a lactone, e.g., polycaprolactone.

As the polyether ester glycol suitably used are those having terminal hydroxyl groups obtainable by polycondensation of an aliphatic dicarboxylic acid, such as adipic acid or sebacic acid, with a poly(oxyalkylene)glycol, such as diethylene glycol, triethylene glycol or tetraethylene glycol.

The polyether includes poly(alkylene-ether) glycols having terminal hydroxyl groups such as poly(ethyleneoxy) glycols, poly(propyleneoxy) glycols, poly(tetramethyleneoxy) glycols, poly(pentamethyleneoxy) glycols, poly(hexamethyleneoxy) glycols, and copolymers thereof, for example, ether-ester copolymers having terminal hydroxyl groups, e.g., caprolactoneethylene oxide copolymer.

As the organic diisocyanate suitably used are naphthylene diisocyanate, p,p'-benzidine diisocyanate, p,p'-diphenylmethane diisocyanate, 2,4- and 2,6-tolylene diisocyanates and the like, and there may also be used aliphatic diisocyanates such as hexamethylene diisocyanate.

The glycol as chain extender includes ethylene glycol, propyleneglycol, butylene glycol, pentamethylene glycol, heptamethylene glycol, octamethylene glycol, diethylene glycol, triethylene glycol, tetraethylene glycol and diols containing benzene ring such as p,p'-diphenylol alkanes, 1,4-phenylene-bis(2-oxyethylether), and short-chain linear polyesters, such as low molecular weight poly(ethylene terephthalate) having terminal hydroxyl groups, and the like.

Polyurethane elastomers may be prepared from these three ingredients by directly reacting a polymeric diol with an organic diisocyanate to form a prepolymer having terminal free isocyanate groups and reacting the prepolymer with a glycol as chain extender in the presence or absence of a solvent which is inert to free isocyanate group, such as dimethylsulfoxide or dimethylformamide. Alternately, the three ingredients may be reacted simultaneously in the presence or absence of such solvent.

The polyurethane elastomer so prepared may be formed into fibers in melt spinning process or in dry or wet spinning process from solutions thereof in solvents such as dimethylformamide, dimethylsulfoxide, tetrahydrofuran.

In the process of the invention, the rate of drawing is not critical as far as it is smaller than the breaking elongation of the polyurethane elastomeric fiber to be processed, though a rate of drawing between 50% and 500% is preferable with regard to elongation setting effect. The drawing temperature also is not critical. The drawing may be carried out without any trouble at a temperature below the melting point or decomposition temperature of the fiber.

The heat set treatment after drawing preferably is conducted at a temperature above 50° C., especially above 130° C. but below the melting point or decomposition temperature of the polyurethane elastomer, though when the polyurethane elastomeric fiber contains at least 0.5% by weight of solvent such as dimethylformamide, dimethylsulfoxide, tetrahydrofuran therein a satisfactory setting effect can be obtained by the treatment at a temperature about room temperature (15° C.).

The heat set treatment may be carried out; for instance, in a hot gaseous bath such as heated air or nitrogen gas or a liquid bath such as heated silicon oil or pressurized hot water or on the surface of hot roller.

The noticeable feature of the process of the invention consists in the heat treatment time. If the heat treatment time is mis-chosen it will be impossible to obtain a required effect. When the heat treatment time is less than 1 second it is almost impossible to expect any setting effect, and when the time is elongated over 30 minutes the heat setting effect once obtained will be lost with leaving an elastic fiber of a finer titre than the original fiber and having an elastic elongation of more than 300%.

The heat treatment time, of course, may be varied within the said limits depending upon, e.g., chemical compositions of polyurethane elastomers and shapes of fibers to be subjected to the treatment.

Another noticeable feature of the invention is that when a polyurethane elastomeric fiber is subjected to a heat treatment for a period of time within the range from 1 second to few minutes the elongation of the fiber is reduced to a value not exceeding 150% and the Young's Modulus and tensile strength are enhanced, therefore the filament becomes similar to non-elastic fibers, but when the fiber so treated is again subjected to a heat treatment under relaxed condition at a temperature within the range from 60° C. to the melting point or decomposition temperature of the polyurethane it recovers an elastic elongation of about 300 to 400% substantially identical with the elastic elongation of the original polyurethane elastomeric fiber (this heat set is hereinafter referred to as "temporary set"). Accordingly, there may be produced elastic, high bulky spun yarns, core spun yarns, covering yarns and woven and knitted fabrics from the temporarily set polyurethane elastomeric fiber by subjecting the fiber either alone or in blend with other fibers to spinning, core spinning, covering, weaving or knitting employing apparatus which has been hitherto employed for non-elastic fibers.

On the other hand, when the heat set treatment after drawing is conducted for a period of time within the range from few minutes to 30 minutes the elongation of the polyurethane elastomeric fiber is completely set, so that the fiber so treated does not recover the elastic elongation of the original fiber even if subjected to the heat treatment under relaxed condition (this is hereinafter referred to as "permanent set"). Even the fiber which has been permanently set has an elastic elongation of at least 50% and exhibits within the elongation limit a momentary elastic recovery of at least 90%, namely, the fiber has such properties that lie between those of non-elastic fibers and of elastic fibers and that can suitably be used in making textiles having particular functions and texture.

The remarkable advantage of the present invention is obtainable only upon the fiber that is made out from a class of polyurethane elastomers as mentioned above, and is of no utility when applied to other polyurethane elastomers such as, for instance, those prepared by reaction of a polyether glycol, an organic diisocyanate and a diamine.

For a better understanding of the invention reference is taken to the accompanying drawings in which, FIG. 1 is a graph indicating the relationship between the variation of the fineness of a polyurethane elastomeric filament and the heat treatment time when the filament is subjected to drawing and subsequent heat treatment;

Figure 1:
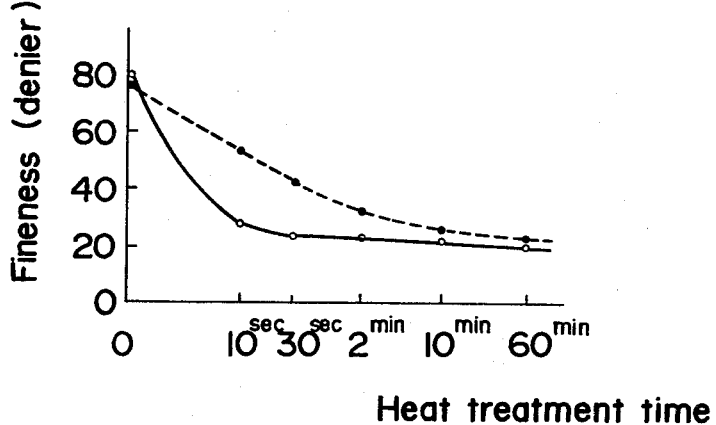
Figure 2:
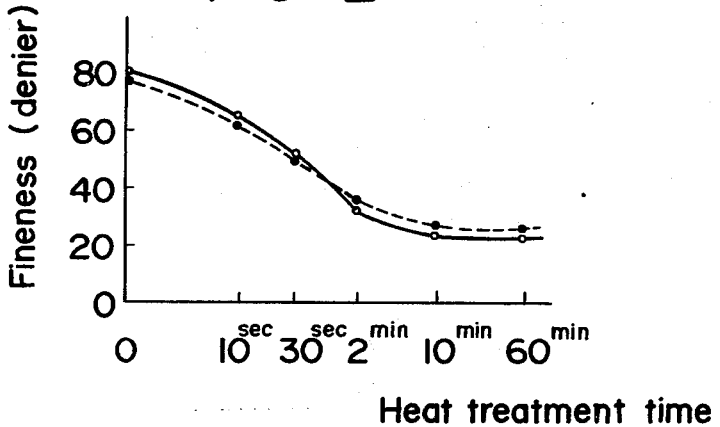
FIG. 2 is a graph indicating the relationship between the fineness of the filament and the heat treatment time after heat shrinking in hot water.
Figure 3:
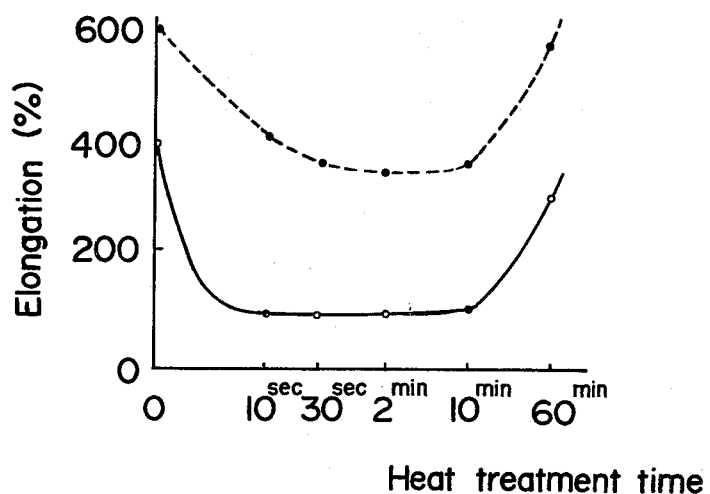
FIG. 3 is a graph indicating the relationship between the variation of the elongation of the filament and the heat treatment time when the filament is subjected to drawing and subsequent heat treatment.

For more concrete illustrations of the heat set effect of the process of the invention, in FIGS. 1 to 6 there are shown variation in the fineness, elongation and tenacity of each fiber when a polyurethane elastomeric fiber formed from a reaction product of poly(ethylene propylene adipate), diphenylmethane-4,4'-diisocyanate and ethylene glycol (this fiber is hereinafter referred as to "elastomeric fiber of the invention") and another polyurethane elastomeric fiber formed from a reaction product of a polyether, diphenylmethane-4,4'-diisocyanate and hydrazine (this fiber is hereinafter referred to as "contrast elastomeric fiber") are cold drawn by 4 times (the rate of drawing of 300%) and subjected to heat set treatment in hot air maintained at 150° C. under the so drawn condition, respectively. In the figures the curves indicated by a solid line are of the elastomeric fiber of the invention and those indicated by a broken line are of the contrast elastomeric fiber. FIGS. 1, 3 and 5 indicate the fineness, tenacity and elongation measured on specimens which have been allowed to stand for 4 days after the heat set treatment and FIGS. 2, 4 and 6 indicate the properties of the specimens which have, after the heat set treatment, been treated in hot water at 100° C. under relaxed condition for 15 minutes.

When subjected to the heat set treatment of a short period of time of at most about 2 minutes the polyurethane elastomeric fiber of the invention is, as indicated by FIGS. 1, 3 and 5, converted to one of a low elongation as low as 100% and of a high tenacity as high as 3 g./d. or more which will recover, upon heat shrinking treatment with hot water, an elongation of about 300% and the fineness substantially identical to that of the original fiber.

Thus, in the elastomeric fiber of the invention there is obtained a very large extent of the effect of temporary set, that is to say, the fiber is converted by the heat treatment of a short period of time to one of a low elongation and of a high tenacity which is turned back to the original state by heat shrinking treatment with hot water, compared with the control elastomeric fiber.

Figure 4:
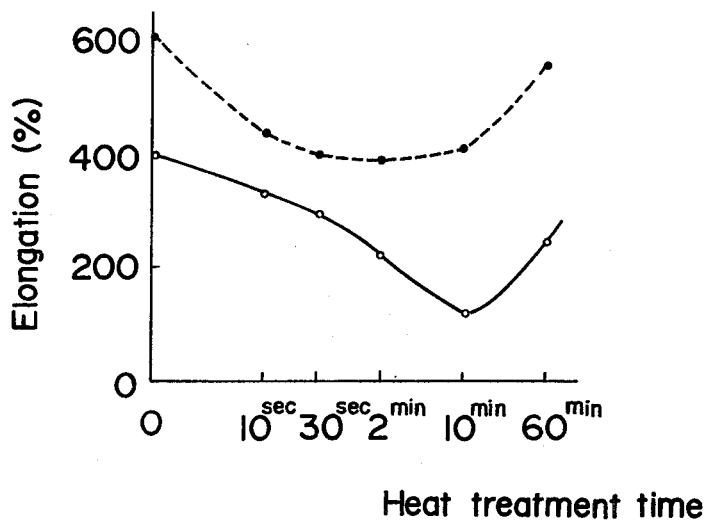
FIG. 4 is a graph indicating the relationship between the elongation of the filament so heat treated and the heat treatment time after heat shrinking in hot water.
Figure 5:
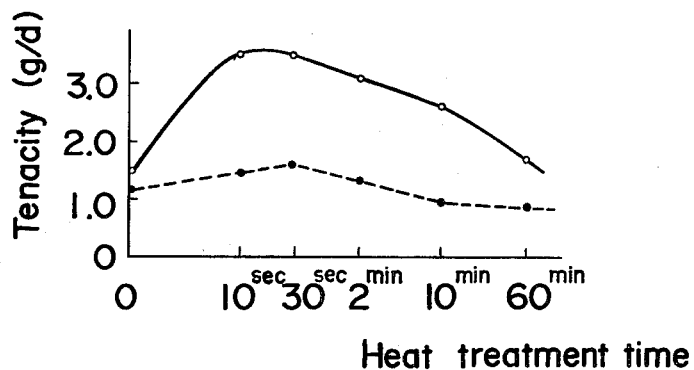
FIG. 5 is a graph indicating the relationhip between the variation of the tenacity of the filament and the heat treatment time upon the heat treatment of the drawn filament.
Figure 6:
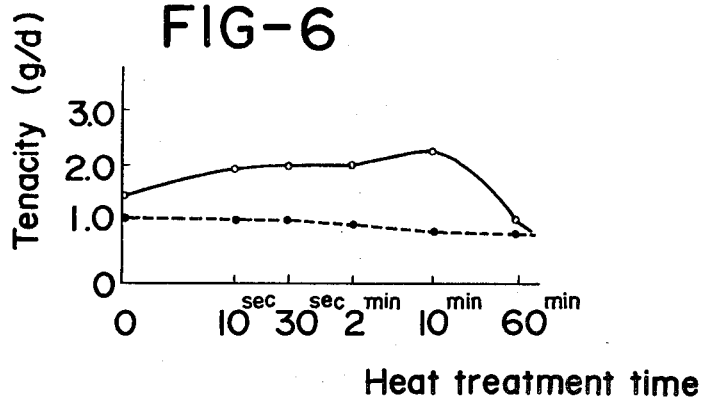
FIG. 6 is a graph indicating the relationship between the tenacity of the filament so heat treated and the heat treatment time after heat shrinking in hot water.

When the heat treatment time is from 2 minutes to 20 minutes the elongation is, as indicated by FIG. 3, decreased to about 100%, the elongation is varied little extent as indicated by FIG. 4 by the heat shrinking treatment with hot water and, as indicated by FIG. 6, the tenacity is enhanced to a considerably high value. However, such effects are scarcely observed upon the contrast elastomeric fiber.

When the fiber is treated under more severe conditions, namely, the heat treatment time is prolonged over 30 minutes, the fineness of the fiber becomes smaller substantially in proportion to the rate of drawing as indicated by FIG. 1, but is substantially unaffected by the treatment with hot water, and, as indicated by FIG. 3, the elongation is substantially unchanged, that is to say, there takes place so-called thinning of filament, but the elastomeric fiber of the invention does not become so affected as the contrast elastomeric fiber.

While the cause of the differential in elongation-setting effects is uncertain, it is believed, judging from an X-ray pattern, that when a low molecular weight glycol is used as chain extender there is formed in elastomer molecule hard segments containing urethane linkage which easily crystallizes under drawing and the resulting crystals are easily set by the heat treatment and, on the other hand, when a diamine is used as chain extender there is formed urein linkage as hard segment in elastomer molecule and the urein linkage is difficult to be crystallized under such drawing and heat treating conditions compared with urethane linkage. A polyurethane elastomer which has been prepared using hydrazine as chain extender contains bis-urein linkage as hard segment, but such a polyurethane elastomer is substantially impossible to be elongation set in accordance with the invention.

The invention will be explained further in detail by the following examples.

EXAMPLE 1

A mixture in a molar ratio of 1.0:1.5 of a poly (ethylene propylene adipate) having terminal hydroxyl groups (molar ratio of ethylene units to propylene units of 9:1, molecular weight of 1,220) and ethylene glycol was dissolved in methyl isopropyl ketone, and then added thereto 0.05% of dibutyltin dilaurate as catalyst and diphenylmethane-4,4'-diisocyanate in the proportion of molar ratio to poly (ethylene propylene adipate) of 1.0:2.55, while stirring. The solution so formed contained 60% of methyl isobutyl ketone. The reaction mixture was heated at 100° C. for 3 hours and, thereafter, methyl isobutyl ketone was eliminated from the reaction mixture by vacuum drying at 70° C. for 3 hours to obtain a polyurethane elastomer. The polyurethane elastomer was dissolved in dimethylformamide to form a 30% solution. To the solution there were added 3%, based on the weight of polymer, of titanium dioxide and 2% of 4,4'-butylidene-bis(3-methyl-6-tert.butylphenol) as antioxidant to form a highly viscous spinning solution having a viscosity of 1,100 poises at 40° C. The spinning solution was extruded through a spinneret having 10 holes each of 0.2 mm. dia. into a spinning cell through which heated air was being circulated and the resulting filaments were, after drying on a hot roller, taken up at a rate of 400 ml./min. The properties of the thread so formed were: a fineness of 105 deniers, a tenacity of 1.17 g./d., an elongation of 420%, a recovery of 98% from 50% extension and a shrinkage of 7.6% upon treatment in hot water at 100° C. for 30 minutes.

The thread was, in accordance with the invention, cold drawn by 250% and subsequently subjected to a heat treatment for 5 seconds on a Nelson roller maintained at 160° C. The thread so treated exhibited the properties as indicated in the following table.

|  | Fineness (denier) | Tenacity (g./d.) | Elongation (percent) | Force of recovery from 50% extension (g./d.) | Recovery from 50% extension (percent) | Shrinkage upon treatment in hot water at 100° C. for 30 min. (percent) |
|---|---|---|---|---|---|---|
| Heat set thread | 35 | 3.28 | 83 | 0.77 | 100 | 56 |
| After heat shrinking treatment in hot water at 100° C. for 5 minutes | 72.5 | 1.65 | 325 | 0.16 | 96 | 2.3 |

The heat set elastomeric fiber which exhibits temporarily a low elongation and a high Young's Modulus can be spun in core spinning process or otherwise processed in the same manner as conventional polyamide, polyester or polyvinyl alcohol fibers without employing tension controller as needed for processing conventional highly extensible elastomeric fibers.

The spun yarn formed from the heat set fiber can easily be woven or knitted into fabrics because of its very low extensibility, and if the fabrics are subjected to heat shrinking treatment in hot water, they recover easily the high extensibilities upon the treatment to obtain extensible fabrics.

In contrast, a fiber which was made out from a reaction product of a polyether, an organic diisocyanate and hydrazine was cold drawn at a rate of drawing of 300% and the fiber subjected to heat set at 160° C. for 10 seconds on a Nelson roller exhibited the properties as indicated in the following table.

|  | Fineness (denier) | Tenacity (g./d.) | Elongation (percent) | Force of recovery from 50% extension (g./d.) | Recovery from 50% extension (percent) | Shrinkage upon treatment in hot water at 100° C. for 30 min. (percent) |
|---|---|---|---|---|---|---|
| Contrast fiber (untreated) | 80 | 1.18 | 596 | 0.03 | 98 | 9.0 |
| Contrast fiber (heat treated) | 67 | 1.22 | 458 | 0.07 | 100 | 16.0 |
| Contrast fiber (heat treated and then subjected to shrinking treatment in hot water at 100° C. for 5 minutes) | 75 | 1.08 | 532 | 0.04 | 98 | 3.5 |

As indicated in the above table, the advantage of the invention is scarcely observable upon the contrast fiber.

EXAMPLE 2

A thread prepared in the same manner as described in Example 1 from a poly(ethylene propylene adipate), diphenylmethane-4,4'-diisocyanate and ethylene glycol was cold drawn by 300% and wound on a bobbin under tension, and heat set by immersing the bobbin in a silicon oil at 140° C. for 10 seconds. The thread so heat set exhibited the properties as indicated in the following table.

|  | Fineness (denier) | Tenacity (g./d.) | Elongation (percent) | Force of recovery from 50% extension (g./d.) | Recovery from 50% extension (percent) | Shrinkage upon treatment in hot water at 100° C. for 30 min. (percent) |
|---|---|---|---|---|---|---|
| Heat set thread | 31.5 | 3.15 | 89.2 | 0.68 | 100 | 54 |
| After heat shrinking treatment in hot water at 100° C. for 10 minutes | 68 | 1.73 | 322 | 0.15 | 97 | 3.7 |

As illustrated in the above table, the elastomeric fiber of the invention is converted temporarily to one of a low elongation and a high tenacity. However an elastomeric fiber formed of a reaction product of a poly(ethylene propylene adipate), diphenylmethane-4,4'-diisocyanate and 4,4'-diaminodiphenylmethane scarcely exhibited any heat treatment effect in accordance with the invention, as in the case of the contrast fiber in Example 1.

EXAMPLE 3

Poly(propyleneoxy) glycol with a molecular weight of 1,050, diphenylmethane-4,4'-diisocyanate and 1,4-butanediol were mixed together in a molar ratio of 1.0:2.6:1.5 and allowed to react at 120° C. for 2 hours to obtain a polyurethane elastomer.

The polyurethane elastomer was dissolved in dimethylformamide to form a 26% solution, then added thereto 2%, based on the weight of polymer, of titanium dioxide and 2% of 4,4'-butylidene-bis(3-methyl-6-tert.butylphenol) as antioxidant. The spinning solution so formed was extruded through a spinneret having 10 holes each of 0.2 mm. dia. into a heated spinning cell maintained at 200° C. Immediately after emergence from the spinning cell, the resulting thread which contained therein 18.7% of residual dimethylformamide was cold drawn by 230% and taken up at a rate of 1,100 m./min.

Although ordinary elastomer fibers, if once cold drawn, return to original state when relaxed and are substantially impossible to be hot stretched because of their good elastic recovery, there may be obtained an elastomeric fiber having a temporary low elongation and high Young's Modulus by drawing the fiber in a state containing a solvent as illustrated above. The properties of the thus treated fiber are summaried in the following table.

The elastic thread possessed the properties as follows: Fineness of 167 denier, tenacity of 0.92 g./d., elongation of 524%, force of recovery of 0.11 g./d. from 50% extension, recovery of 97% from 50% extension and shrinkage of 5.5% upon treatment in hot water at 100° C. for 30 minutes.

The elastic thread was then cold drawn at a rate of drawing of 300% and in the so stretched state wound on a bobbin, and was subjected to heat set treatment in heated air at 150° C. under conditions as indicated in the following table. The results are summarized in the following table.

| Heat set time | Specimens | Fineness (den.) | Tenacity (g./d.) | Elongation (percent) | Force of recovery from 50% extension (g./d.) | Recovery from 50% extension (percent) | Shrinkage upon treatment in hot water at 100° C. for 30 min. (percent) |
|---|---|---|---|---|---|---|---|
| 30 sec. | Heat set | 68 | 2.73 | 97 | 0.63 | 100 | 57 |
| | Heat set and relaxed in hot water at 100° C. for 30 minutes | 138 | 1.55 | 427 | 0.18 | 97 | 3.0 |
| 8 min. | Heat set | 54 | 2.58 | 107 | 0.61 | 100 | 5.8 |
| | Heat set and relaxed in hot water at 100° C. for 30 minutes | 56 | 2.49 | 115 | 0.59 | 99 | 1.1 |
| 60 min. | Heat set | 44 | 0.93 | 476 | 0.15 | 98 | 3.6 |
| | Heat set and relaxed in hot water at 100° C. for 30 minutes | 45 | 0.90 | 487 | 0.15 | 97 | 1.8 |

As illustrated in the above table, depending upon the conditions of the heat treatment under tension after cold drawing there was obtained a temporarily set fiber which exhibits a low elongation but turns back to a highly extensible elastic fiber when the heat treatment time was 30 seconds or an elastic fiber having permanently set low elongation and high tenacity which is unaffected by the treatment with hot water when the heat treatment time was 8 minutes.

However, the heat treatment time of 60 minutes resulted in a thinned fiber which remained the properties of the original fiber except the reduced titre.

EXAMPLE 5

Polyurethane elastomer was polymerized by mixing polyethylene propylene adipate having terminal hydroxyl groups (molecular weight: 1,900, ratio of copolymerization; ethylene glycol: propylene glycol=9:1), diphenyl methane - 4,4' - diisocyanate and ethylene glycol in the molar ratio of 1:5:4, and by reacting said admixture at a temperature of 140° C. for one hour.

30% concentration of spinning solution was prepared

| | Fineness (denier) | Tenacity (g./d.) | Elongation (percent) | Force of recovery from 50% extension (g./d.) | Recovery from 50% extension (percent) | Shrinkage upon treatment in hot water at 100° C. for 30 min. (percent) |
|---|---|---|---|---|---|---|
| Cold drawn filament | 39 | 3.02 | 105 | 0.62 | 100 | 53 |
| After heat shrinking treatment in hot water at 100° C. for 10 minutes | 78 | 1.54 | 368 | 0.15 | 97 | 3.7 |

The filament with a low elongation and high Young's Modulus so formed could be core-spun in a conventional manner without drafting at front roller. By treating the core spun yarn in hot water at 100° C. for 10 minutes in relaxed state, there was obtained a stretch yarn. The properties of the polyurethane elastomeric fiber in the stretch yarn were similar to those of said cold drawn filament which had been treated in hot water at 100° C. for 10 minutes.

EXAMPLE 4

A polyurethane elastomer, as employed in Example 3, was dissolved in dimethylsulfoxide to form a spinning solution of a polymer concentration of 15%. The spinning solution was wet spun in a conventional manner in an aqueous coagulating bath containing 30% of dimethylsulfoxide through spinneret having 50 holes each of 0.08 mm. dia. The elastic thread thus formed was, after washing with water and drying, taken up at a rate of 10 m./min.

by dissolving said polymethane elastomer in dimethylformamide, and by adding 2% by weight of titanium dioxide and 1.0% by weight of 3-methyl-6-tert.butylphenol, the weight of both being based on the amount of elastomer. Then said spinning solution was extruded through a spinneret having 20 holes of 0.2 mm. dia. into a spinning cell heated at 240° C., and drawn with the first roll (r.p.m. 400 m./min.) and with the second roll (r.p.m. 1,600 m./min.) after oiling the filament with an oiling roll to form filaments. The cold draw ratio between the first roll and the second roll was 300%. The residual dimethylformamide in the drawn filament remained as 8.9%. The properties of said elastic fiber, drawn in the state containing said solvent, exhibited high tenacity, low elongation, and the high Young's Modulus as shown in the following table.

Moreover, in the fiber obtained by this system a high elongation could be recovered to elastic fiber by treating the fiber with hot water under no-tension.

Properties of elastic fiber after drawing:
    Fineness (den.) _____ 39
    Tenacity (g./d.) _____ 2.97
    Elongation (percent) _____ 92
    Elastic recovery (50%) _____ 99

Properties of elastic fiber treated with water at 100° C. for 10 min. after drawing:
    Fineness (den.) _____ 86
    Tenacity (g./d.) _____ 1.69
    Elongation (percent) _____ 307
    Elastic recovery (50%) _____ 97

For comparison, the properties of the elastic fiber obtained from said spinning solution by passing through the first roll (400 m./min.) and the second roll (420 m./min.) at the speed of 420 m./min. was that of ordinary elastic fiber of high elongation as shown below.

Fineness (denier) _____ 142
Tenacity (g./d.) _____ 0.92
Elongation (percent) _____ 496
Elastic recovery (50%) _____ 98

EXAMPE 6

Polybutylene adipate having terminal hydroxyl groups (molecular weight: 1,000) and 1,4-butanediol were mixed in a mixing ratio of 10:15 and dissolved in isobutylketone in such a manner that the concentration becomes 60%, which is maintained at a temperature of 50° C.

A powdered elastomer was obtained by mixing said solution with 1.0% by weight, based on the amount of said polybutylene adipate, of triethylamine as catalyst and with diphenylmethane-4,4'-diisocyanate (which amounts to molar ratio of 2.25 per 1 of polybutylene adipate), and by reacting the admixture at a temperature of 100° C. for 3 hours in Kneader.

Polyurethane elastomer was obtained after completing reaction for 3 hours in vacuum which takes methyl isobutylketone out from the reaction vessel. Said polyurethane elastomer was dissolved in tetrahydrofuran to make 17% concentration of spinning solution.

Said spinning solution was extruded through a spinneret having 100 holes with 0.08 mm. dia. of hole, into water containing 20% (by weight) of tetrahydrofuran to make filament.

Said filament spun as above was wound on a bobbin at the speed of 35 m./min. after passed through the roll at 10 m./min. and drawn at the rate of 250% in the second coagulating bath which contains tetrahydrofuran.

The amount of said tetrahydrofuran contained in the filament while in the first coagulating bath was 38% by weight of the polymer.

Thus the properties of the elastic fibers subjected to such a treatment of two-bath drawing method exhibited very low elongation as shown in the following table.

Properties of elastic fiber after drawing:
    Fineness (den.) _____ 168
    Tenacity (g./d.) _____ 2.86
    Elongation (percent) _____ 77
    Elastic recovery (50%) _____ 98

Properties of elastic fiber treated with water at 100° C. for 10 min. after drawing:
    Fineness (den.) _____ 292
    Tenacity (g./d.) _____ 1.3
    Elongation (percent) _____ 293
    Elastic recovery (50%) _____ 97

For the sake of comparison, a prepolymer was produced by reacting polytetramethylene glycol of 1,500 molecular weight having terminal hydroxyl groups with diphenylmethane-4,4'-diisocyanate in the molar ratio of 10:4.5 at a temperature of 90° C. for 3 hours.

A polyurethane elastomer was produced by, firstly, dissolving said prepolymer in D.M.F. and secondly, by adding 4,4'-diphenylaniline dissolved in D.M.F. at the molar ratio of 1:0.6 to polytetramethylene glycol, to said prepolymer solution to extend the molecular chain.

The result of the tests in which above mentioned polyurethane was utilized may be shown in the following.

A spinning solution made of 15% concentration of polyurethane elastomer in D.M.F. was extruded through a spinneret having 100 holes with 0.08 mm. dia. of hole into water containing 10% by weight of D.M.F. The filament spun as above was wound on a bobbin at the speed of 32 m./min. after drawn 250% in the second bath containing warm water maintained at 50° C.

As shown in the following table, the properties of the elastic fiber spun in the above mentioned conditions indicated less effectiveness and less contribution to after treatment such as spinning because the degree of decrease rate in elongation was not enough for spinning compared with that of the polyurethane elastomer made of the polyester-diisocyanate system of the invention.

The fiber after drawing:
    Fineness (den.) _____ 188
    Tenacity (g./d.) _____ 1.45
    Elongation (percent) _____ 260
    Elastic recovery (50%) _____ 100

The fiber treated with hot water at 100° C. for 10 min. after drawing:
    Fineness (den.) _____ 308
    Tenacity (g./d.) _____ 0.91
    Elongation (percent) _____ 426
    Elastic recovery (50%) _____ 100

EXAMPLE 7

The properties of filaments which were respectively wet spun by extruding the same spining solution as described in Example 5 through a spinneret having 20 holes with 0.2 mm. dia. of hole, into a spinning cell, drawing 280% between the first and the second rolls, and drying in such a way that undermentioned necessary amounts of solvent are retained in the filament respectively are shown in the following table.

| Sample No. | Fineness (den.) | Tenacity (g./d.) | Elongation (percent) | Percent of solvent content at drawing operation | Physical behavior of filament wound on spinning bobbin |
|---|---|---|---|---|---|
| 1 | 128 | 1.26 | 392 | 0.4 | Set of elongation is impossible even with drawing between rolls, filament shrinks to its original state when removed from a bobbin on which filament wound. |
| 2 | 69 | 2.3 | 136 | 2.6 | Filament is wound on the bobbin in stretched state such filament shrinks a little when removed from the bobbin. |
| 3 | 49 | 3.11 | 87 | 18 | Even removed from the bobbin, filament remains the state when it was wound. The setting of elongation is perfect. |

From the data shown above, it is desirable to retain solvent more than 0.5% by weight based on the amount of the elastomer. Particularly, more than 2% of solvent should be retained in the elastomer for reasonable ingredients.

EXAMPLE 8

A spinning solution having 17% concentration of polyurethane elastomer was made by dissolving said elastomer in dimethylsulfoxide. The elastic filaments were produced by extruding said spinning solution through a spinneret having 100 holes with 0.08 mm. dia. of hole, into the first aqueous coagulating bath which contained 10% by weight of said dimethyl sulfoxide and 2% by weight of certain cohesive inhibitor, and drawing said extruded filament at the second coagulating bath with each draw rate shown in the following table respectively.

| Sample No. | Draw rate at the second coagulating bath (percent) | Fineness (denier) | Tenacity (g./d.) | Elongation (percent) |
|---|---|---|---|---|
| 1 | 0 | 4.73 | 0.68 | 534 |
| 2 | 50 | 3.42 | 0.93 | 388 |
| 3 | 150 | 2.08 | 1.78 | 142 |
| 4 | 300 | 1.39 | 2.95 | 72 |

Upon spinning above mentioned fibers after cutting them in staple length and mixing with other kind of fibers, the fibers drawn at a rate more than 150% were spun in good condition but the fibers which were drawn at a rate of 0% in the second coagulating bath were failed to spin.

What is claimed is:

1. An elastomeric polyurethane fiber having an elongation of less than 150% and a tenacity of up to 3 grams per denier prepared by the process of treating a fiber having an elongation of about 400% to about 525% and a solvent content of at least 0.5% by weight, said fiber being prepared from the reaction product of a polymeric diol having a molecular weight between 200 and 8,000, an organic diisocyanate and a glycol, said treatment consisting essentially of (1) simultaneously heating and stretching said fiber or heating said fiber after stretching at from 50° C. up to the melting or decomposition point of said fiber, and (2) said stretching being characterized by a draw ratio less than the breaking elongation of said fiber and being maintained for a duration of from one second to 30 minutes.

2. The polyurethane fiber of claim 1 wherein said fiber is produced from poly(ethylene propylene adipate), diphenylmethane-4,4'-diisocyanate and ethylene glycol.

3. The polyurethane fiber of claim 1 wherein said draw ratio is 50 to 500%.

4. The polyurethane fiber of claim 1 wherein the drawn fiber is heated at a temperature above 130° C. but below the melting point or decomposition temperature of said fiber.

References Cited

UNITED STATES PATENTS

| | | | |
|---|---|---|---|
| 3,164,439 | 1/1965 | Muehlhausen et al. | 8—115.5 |
| 3,296,212 | 1/1967 | Britain | 260—75 |
| 3,154,611 | 10/1964 | Dinbergs | 264—176 |
| 3,047,909 | 8/1962 | Boyer | 264—346 |
| 3,377,308 | 4/1968 | Oertel. | |
| 3,384,623 | 5/1968 | Inove et al. | 264—184 UX |
| 3,111,805 | 11/1963 | Boyer | 264—171 |
| 3,117,906 | 1/1964 | Tanner | 264—171 |

DONALD E. CZAJA, Primary Examiner

H. S. COCKERAM, Assistant Examiner

U.S. Cl. X.R.

260—77.5 AA, 77.5 AM, 77.5 SP; 264—184, 205, 210 F, 290 R